Patented Jan. 10, 1939

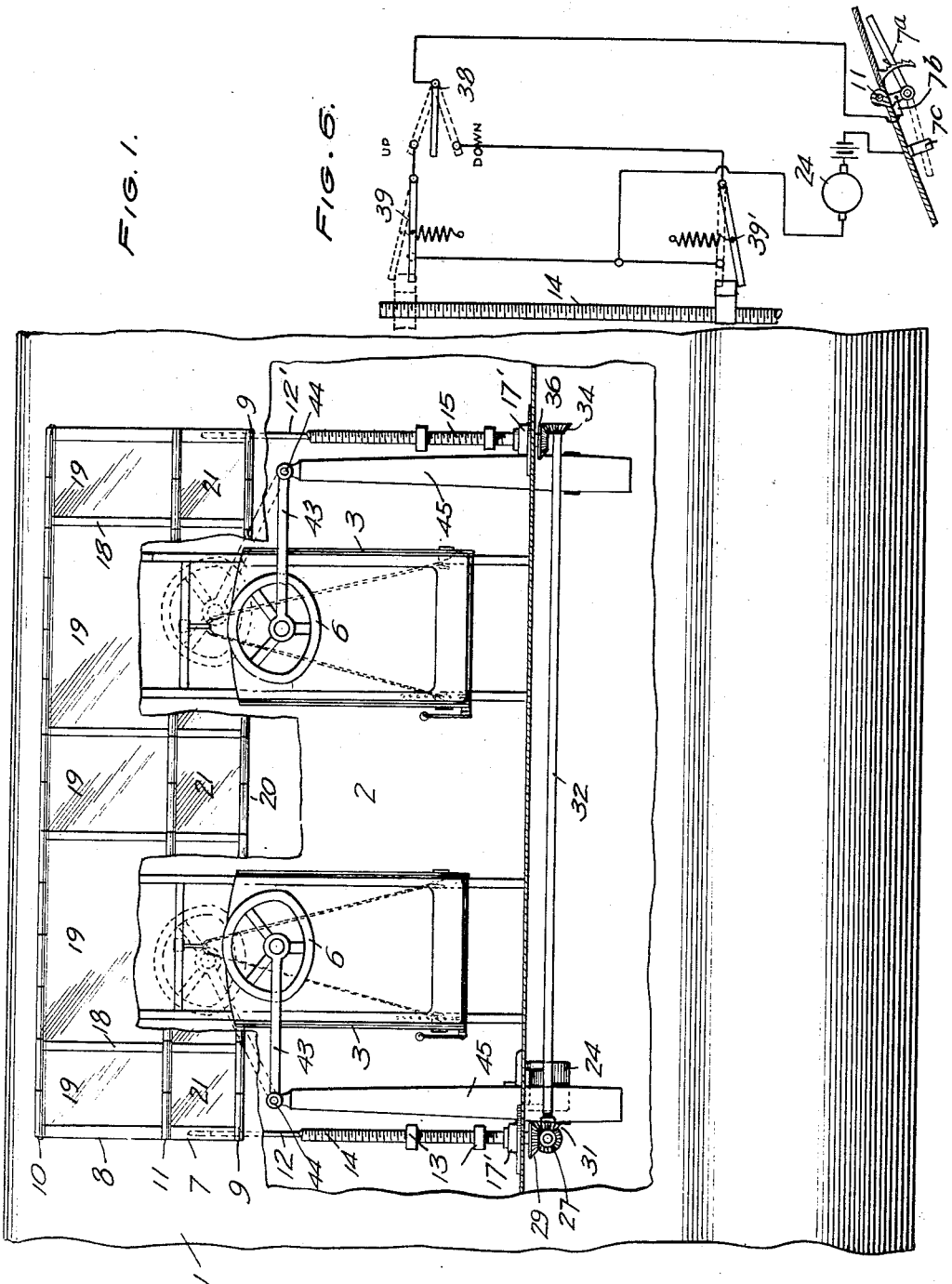

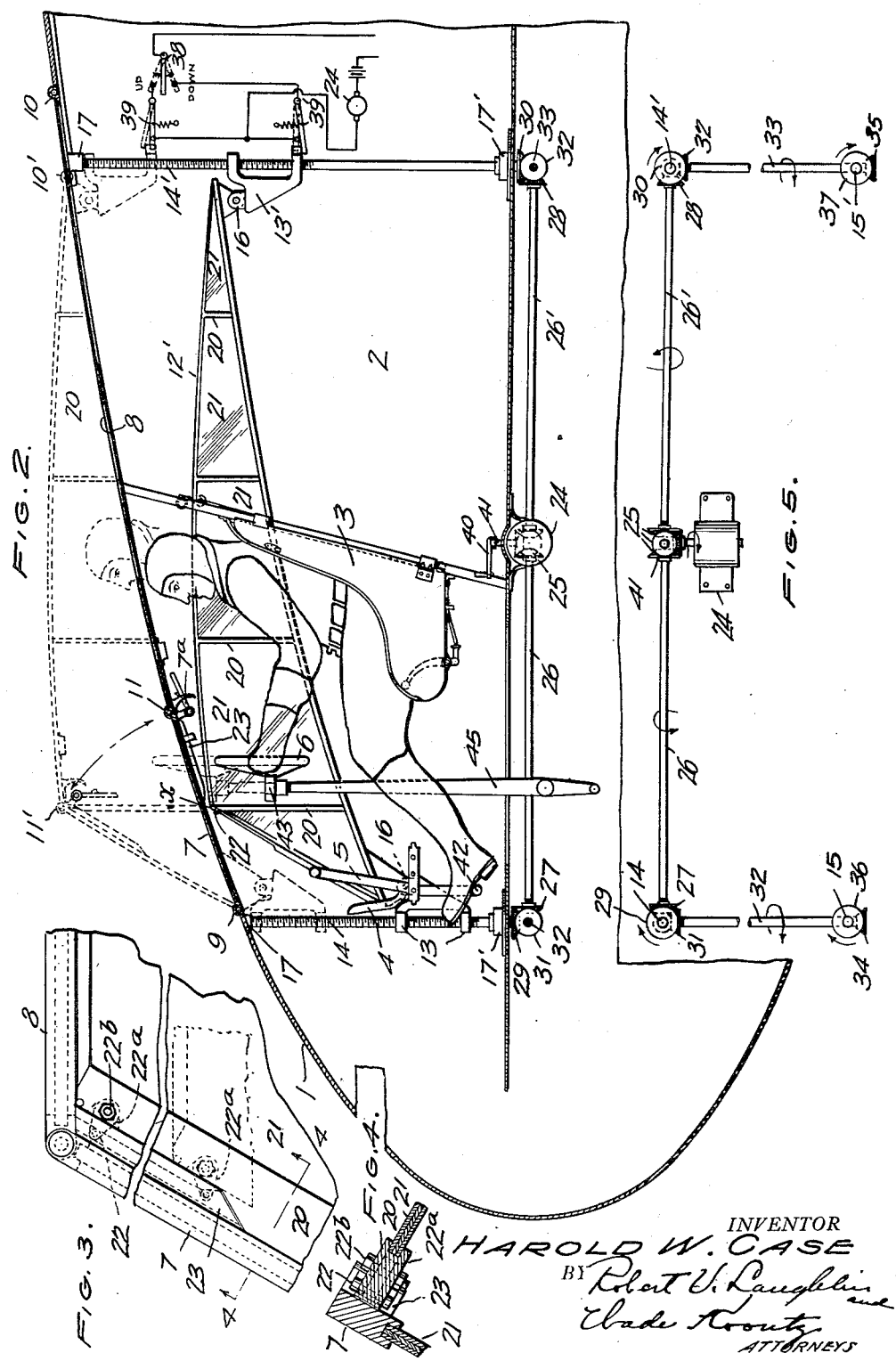

2,142,997

UNITED STATES PATENT OFFICE 2,142,997

RETRACTABLE CABIN ENCLOSURE FOR AIRCRAFT

Harold W. Case, Dayton, Ohio

Application May 26, 1936, Serial No. 81,871

12 Claims. (Cl. 244—121)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to aircraft and is directed chiefly to improvements in the cabin enclosure for the pilot, crew, and passengers to be carried thereby. While the invention is intended for use with all types of aircraft, it is particularly adapted to large types of heavier-than-air craft where the crews' quarters are contained either in the wing or in the fuselage of the craft.

An important object of the improvements is to provide a cabin enclosure which during the greater part of the flight of the craft may be retracted completely flush with the surface of the wing or fuselage in which the cabin is located to avoid head resistance while at the same time affording adequate outside vision to the pilot, crew or passengers, and which also may be extended or raised to give greater outside visibility when more than the usual visibility is necessary or desired at short intervals of time, as when taking off or landing.

Other important objects of the invention are, first, to provide for increase in the performance of aircraft by the elimination during the greater part of the time the craft is in flight of the drag or parasite resistance of the cabin; second, to provide a retractable and extendable cabin enclosure adapted for use not only on heavier-than-aircraft but also on airship cars or gondolas and wherever required for the use of pilots, observers or passengers, and, third, to provide a cabin enclosure adapted to be extended and retracted with ease and quickness either manually or by electromechanical means.

The above objects are attained by the mechanism disclosed in the accompanying drawings, in which:—

Figure 1 is a front elevation of the center section of the wing of a large monoplane provided, in adaptation of the invention, with a retractable and extendable cabin enclosure for a pilot and a co-pilot.

Figure 2 is a vertical longitudinal section thereof;

Figure 3 is a detail view of the cabin enclosure in raised position

Figure 4 is a section on line 4—4 of Figure 3.

Figure 5 is a detail view, in top plan, of the cabin retracting and extending mechanism, and Figure 6 is a diagrammatic view of the motor and stop switch circuits.

In the drawings, 1 indicates the center section of a large monoplane wing in which is located a cabin area or compartment 2, for a pilot and a co-pilot, equipped with pilots' seats 3 and dual controls including brake pedal 4, rudder pedal 5 and control wheel 6. The compartment 2 is the enclosed cabin type and the top of the retractable cabin enclosure comprises a fore-part, or windshield 7 and an aft part, or roof, 8. The windshield turns about a fixed hinge 9 at its leading edge while the roof turns about a sliding hinge 10 at its trailing edge. A hinge joint 11 couples the trailing edge of the windshield with the leading edge of the roof. It will thus be noted that the top cabin enclosure is hinged at three points or axes and that two of the hinge axes, 10 and 11, move during the operation of extending or retracting the cabin enclosure so that when the cabin is in the extended or raised position, its shape is consistent with the conventional cabin used on aircraft and when in its retracted position it is completely flush with the surface of the wing. With the cabin completely flush with and conforming to the contour of the surface of the wing, the head resistance of a cabin is eliminated and the lift over that part of the wing where the cabin is located is not destroyed in the least.

The sides of the retractable cabin enclosure include two movable side panels, 12 and 12', normally disposed within the cabin space of the wing section and at relatively opposite sides of the cabin space. Side panel 12 is supported at its front and rear end by brackets 13 and 13' threaded on vertically disposed rotatable screws 14 and 14' respectively. Side panel 12' is mounted in a similar manner on screws 15 and 15'. When the screws are turned in the proper direction, the sides 12 and 12' of the cabin enclosure move upward and contacting initially at $x$ with the top of the enclosure, act as cams which force the windshield 7 and roof 8 into an extended position; the windshield turning about the fixed hinge 9. As the retractable cabin enclosure takes shape, the hinge 11 moves about hinge 9 as a center and finally stops at 11' while the hinge 10 slides forward and assumes the position at 10'. It will thus be seen that when the sides 12 and 12' have reached their upward limit of travel, they have made contact with the top of the retractable cabin enclosure in such a manner as to form, in conjunction with the latter, an enclosed extension of the cabin area. To compensate for an uneven upward movement of the sides 12 and 12', in order to prevent binding on the screws, pivot points 16 are provided at the front and rear end of each of the said sides. The upper ends of the screws for raising the sides of the cabin are supported by means of bearings 17 and the lower ends of the screws are provided with thrust bearings 17'.

The entire top of the cabin enclosure, or as much of the top area as is deemed necessary, may be transparent material with the exception of that part 18 which is required to provide frames, for the glass or other transparent material 19, and bracing for the structure as a whole. The side panels 12 and 12' also consist of frame structures 20 for the transparent material 21. To prevent the top of the cabin enclosure separating from the side panels, due to air bumps or suction around the cabin as it is being raised or lowered into position, each side panel frame 20 has a T-section 22 which is adapted, when the sides come in contact with the top at points x, to slide into a restraining groove 23 in the windshield frame. As will be clear from Figs. 4 and 5, the T-section of each side panel has its stem portion disposed within a recess 22a in the edge of the panel frame 20 to which it is pivotally secured by a pivot bolt or other suitable means 22b. The top of the cabin enclosure, when retracted and conforming to the contour of the upper surface of the wing, may be locked in position by means of suitable clamps 7a easily accessible to the pilot.

The operating mechanism for extending and retracting the cabin enclosure comprises, in addition to the screws 14, 14', 15 and 15', reversible electric motor 24 from which power is transmitted through the bevel gears 25 to the shafts 26 and 26'. These shafts are provided at their outer ends with bevel gears 27 and 28, respectively. Gears 27 and 28 mesh with bevel gears 29 and 30 respectively, at the lower ends of the screws 14 and 14' on which the side panel 12 is mounted. Gears 29 and 30 mesh with gears 31 and 32 carried by shafts 32 and 33. These latter shafts extend at right angles to the shafts 26 and 26' and have bevel gears 34 and 35 which mesh with bevel gears 36 and 37 on the lower ends of screws 15 and 15' on which side panel 12' is mounted. By means of this arrangement, the side panels 12 and 12' are raised and lowered simultaneously.

As shown in Figure 5, the electric motor is connected in electrical circuit with a controller or switch 38 to be operated by the pilot for extending and retracting the cabin enclosure. Electric cut-off switches 39 and 39' are located at the extremities of the travel of one of the side panel assemblies to be automatically and alternately operated by abutment with a bracket 13' when the latter reaches the proper upward or downward limit of its travel, for breaking the circuit and stopping the motor. In order to prevent damage to the electric motor 24, in the event switch 38 is closed for raising the cabin enclosure without first unlocking the clamp 7a, the motor circuit also includes an additional circuit maker and breaker formed in part by the handle of the clamp 7a which for this purpose has one of the battery leads connected therewith as shown at 7b in Figure 6, and in part by a metal clip 7c on the windshield 7 with which is connected the other lead of the battery. The handle 7a engages the clip 7c for closing the motor circuit at this point only when it is thrown over in the position indicated in dotted lines in Figure 6. Hence, the clamp 7a must be released and placed in circuit closing position before the cabin enclosure can be raised or extended by manipulation of the switch 38.

During the greater part of the airplane's mission, or flight, the cabin enclosure will be in its retracted position. At this time, the pilot's seat 3, which is adjustable up and down throughout a range suitable for the proper accommodation of the pilot, will be located as shown in full lines in Figure 2. A standard type of Air Corps seat is used with the exception that it has a greater adjustment of position up and down. When the pilot is occupying the position shown in full lines, i. e., with the cabin enclosure in the retracted position, the transparent material of the windshield and roof affords him sufficient visibility and in operating the controls he uses an extension 42 provided on the rudder pedal 5. No extension of the brake pedal 4 is provided since it is assumed that the airplane will never be taken off or landed while the pilot is occupying the retracted position in the cabin. Before taking off or landing the airplane, the pilot will first extend the cabin enclosure in order that he may have a clear and unobstructed view in all directions. The dotted line structure of Figure 2 shows the position of the cabin, pilot, and controls when the cabin is in the extended position and the seat 3 has been raised to the proper elevation. In the extended or raised position of the cabin and seat, the pilot uses the brake and rudder pedals 4 and 5, which are of conventional design. In this same position, the pilot raises the control wheel 6 to a comfortable location, as indicated in dotted lines, by pivoting the control wheel arm 43 about a point 44 on the control wheel column 45. The conventional type of cabin, by reason of its fixed and constant position of projection, adds appreciable drag to the airplane throughout its entire mission and thereby lowers the speed of the craft, whereas the herein described extendable and retractable cabin enclosure is extended only when taking off and landing and, hence, adds drag to the airplane during a very short part only of the time the craft is in the air.

Although the invention is described in the foregoing with reference to its specific application to the wing of a monoplane, it is to be understood that this constitutes but one of many possible embodiments of the invention and that the latter is adapted to be used not only on heavier-than-air craft but also on airship cars or gondolas and for the benefit of pilots, observers, or passengers. It may, for instance, be applied in the inverted position to the bottom surface of a wing, fuselage, or gondola for observation downward. This arrangement is particularly adaptable for bombardment type airplanes.

Having thus described the invention, what is claimed as new and novel is:

1. An aircraft body provided with a cabin and having transparent extendable and retractable top and side cabin-closure members movable to and from a position of coincidence with the surface of the body from and to a position of projection beyond the surface of the body, the top cabin-closure member consisting of jointed sections movable about predetermined axes to provide in the outwardly extended position of the top member a windshield portion and a roof portion, and means for extending and retracting the said cabin-closure members.

2. An aircraft body enclosing a cabin space and provided with an extendable and retractable cabin-enclosing portion including hingedly connected sections one of which has a fixed hinge-connection with the said body while the other has a slide hinge-connection therewith whereby the said cabin-enclosing portion is adapted to be extended above the body to provide an outward extension of the cabin space and retracted to a position substantially flush with the surface of the body, and means for extending and retracting the said cabin-enclosing portion.

3. An aircraft body having an extendable-and-retractable cabin including a transparent cabin closure member of jointed sections adapted in the extended position of the cabin to provide a windshield and a roof for the cabin and adapted in the retracted position of the cabin to conform to and form a part of the surface of the said body, and means for extending and retracting the said cabin.

4. An aircraft body having a cabin provided with an extendable and retractable roof and windshield adapted in the extended position to project outwardly of the surface of the body and in the retracted position to conform to the surface contour of the body, upwardly movable side panels in said cabin adapted when moved upwardly to engage and move the said roof and windshield from their retracted to their extended position, and means for raising and lowering the said side panels.

5. An aircraft body having a cabin space and extendable and retractable cabin enclosing members including a transparent air shield across the forward portion of the cabin space and hingedly connected to the body for swinging movement to and from a retracted portion in which it conforms to and forms part of the surface of said body from and to an extended position in which it provides an outward extension of the cabin space, a roof member having a slide hinge connection at one end with the said body and at its other end being coupled to the air-shield for extension and retraction therewith, upwardly movable side panels in said compartment for closing the sides of the cabin extension, and means for extending and retracting said cabin enclosure members.

6. An aircraft body having a passenger compartment therein, a windshield enclosing the forward top portion of said compartment and hinged to said body for swinging movement to and from a retracted position conforming to the streamline contour of the body from and to a position of projection outwardly of the body, a roof panel enclosing the rear top portion of said compartment, said roof panel having at its trailing end a slide hinge connection with the said body and being hingedly coupled at its forward end to the said windshield for projection and retraction therewith, and means for extending and retracting the said windshield.

7. In an aircraft, a cambered body enclosing a cabin space and provided with an articulate surface forming transparent section affording outside view to an occupant of the cabin and hinged at three points whereby it may be raised from a retracted flattened condition in which it conforms to and forms part of the body contour to an extended position in which it forms a projection upon the surface of the body, and means for raising and retracting the said section.

8. In an aircraft, a cambered body enclosing a cabin space and provided with cabin closures including an articulate transparent section affording outside views to an occupant of the cabin and hinged at three points whereby it may be raised from a retracted flattened condition in which it conforms to and forms part of the surface of the body to an extended position in which it forms a projection upon the surface of the body, transparent panels mounted on said body for extension and retraction with said articulate section and adapted in the extended condition of the latter to form therewith an enclosed outward extension of the cabin space, and means for extending and retracting the said panels and the said transparent section.

9. An aircraft body having a pilot's compartment, a top closure for said compartment hingedly connected with the body for movement into an extended position outwardly thereof, outwardly movable side closures in said compartment adapted during the outward movement thereof to abut and lift the said top closure to its extended position, means for extending and retracting the said side closures, and complementary elements on the said top and side closures adapted to interlock during the extension of the parts to prevent separation of the closures while the same are being raised and lowered into position.

10. In an aircraft, a cabin having an extendable and retractable closure, electrical means for extending and retracting the said closure and including a motor circuit and a control switch, and locking means operable in the retracted condition of the closure to lock the same in this condition, said closure locking means being included in said motor circuit to provide an additional switch operating in its closure locking position to open the circuit and in its closure-releasing position to close the circuit.

11. An aircraft body having a compartment, a top closure for the said compartment hingedly connected with the body for movement into an extended position outwardly thereof, said top closure having T-grooves on its underside, outwardly movable side closures in the said compartment adapted when moved outwardly thereof to abut and move the said top closure to its extended position, means for extending and retracting the said side closures, and T-slides on the said side closures adapted to slide in the said T-grooves of the top closure during the extension and retraction of the said top and side closures.

12. A vehicle body having a compartment provided with a top closure member hingedly connected with the body to swing outwardly of the compartment and auxiliary side closure members mounted in the body for movement outwardly and inwardly of the compartment and during their outward movements abutting against and moving the said top closure member outwardly of the compartment, electro-mechanical means including an electrical motor circuit for moving the said side closure members, and motor cut-off switches located at the extremities of travel of one of the said side closure members to be directly and alternately contacted and operated by the latter for opening the motor circuit at each end of travel of the side closure member.

HAROLD W. CASE.